Figure 1:
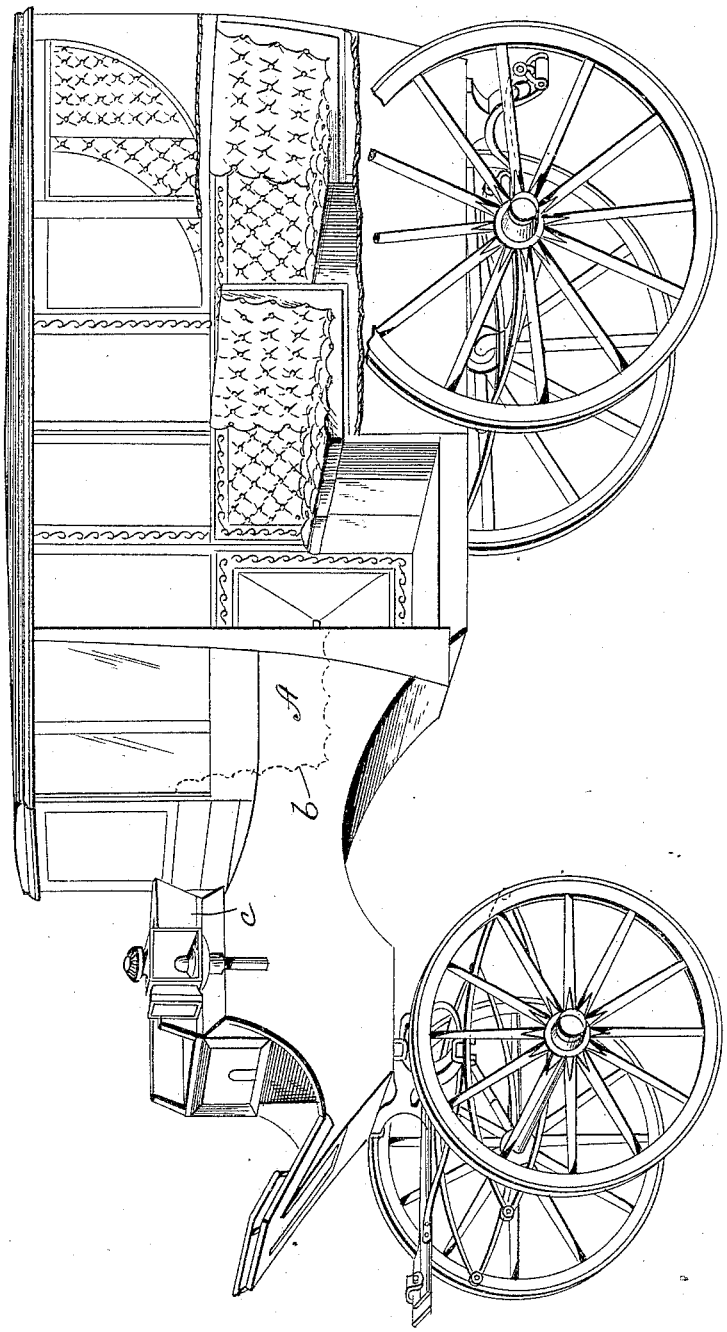

(No Model.) 2 Sheets—Sheet 1.

A. E. HERMAN.
CAB FOR PALL BEARERS.

No. 421,934. Patented Feb. 25, 1890.

Attest
Walter P. Keene
Edith Grib

Inventor
A. E. Herman
by Walter Donaldson & Co.
Attys.

(No Model.)  2 Sheets—Sheet 2.
A. E. HERMAN.
CAB FOR PALL BEARERS.
No. 421,934.  Patented Feb. 25, 1890.
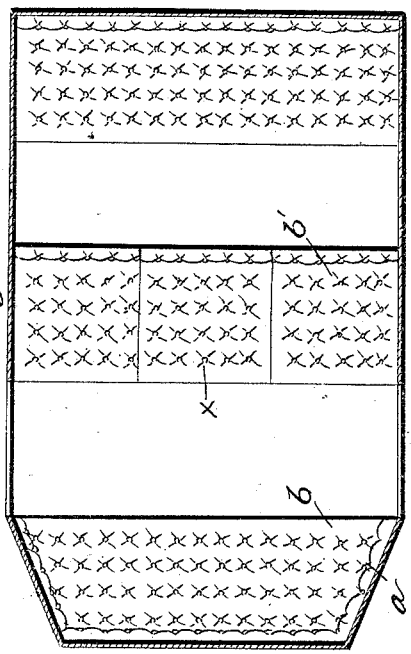
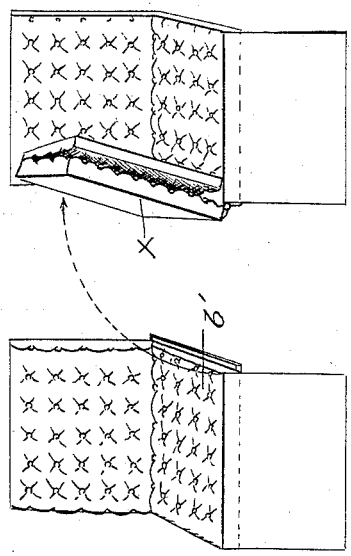
Attest
Walt P. Keene
Edith Grib
Inventor
A. E. Herman
by Walter Donaldson & Co
Attys.

UNITED STATES PATENT OFFICE.

ADOLPH E. HERMAN, OF TERRE HAUTE, INDIANA.

CAB FOR PALL-BEARERS.

SPECIFICATION forming part of Letters Patent No. 421,934, dated February 25, 1890.

Application filed October 8, 1889. Serial No. 326,320. (No model.)

*To all whom it may concern:*

Be it known that I, ADOLPH E. HERMAN, a citizen of the United States of America, residing at Terre Haute, in the county of Vigo and State of Indiana, have invented certain new and useful Improvements in Pall-Bearers' Cabs, of which the following is a specification, reference being had therein to the accompanying drawings.

My invention is an improved pall-bearers' cab designed to convey eight persons. Heretofore such cabs have been made with the door in the rear and the seats arranged along the side, and this form of vehicle has been found objectionable by reason of the persons being subjected to the lateral swaying and jolting of the cab, and also on account of the cab having to be backed into the sidewalk, in order to allow the persons access without getting into the gutter or roadway, thus occasioning loss of time and inconvenience.

My invention consists of a closed cab formed with a contracted front part, a seat within said contracted part facing the rear and capable of holding two persons, an outside seat for the driver, the door in the side immediately in rear of the front seat, and two seats in rear of the door and entirely inclosed, said seats being capable of holding three persons, and the forward one having a shifting section adapted to be moved for affording a passage-way to and from the rear seat.

In the drawings, Figure 1 is a perspective view of the cab. Fig. 2 is a plan view. Fig. 3 is a perspective view of the seat.

In the drawings, the cab A is built in elongated form, the body being entirely closed and having its front part contracted, as at $a$. Within this portion is a seat $b$, facing toward the rear, said seat being capable of seating two persons. The seat for the driver is shown at $c$ outside the cab. The doors are located in the side of the cab, so that the vehicle can be driven up to be loaded, as is an ordinary carriage, and these doors open just in rear of the front inside seat. In rear of the doors is a transverse seat $b'$, which extends across the wide part of the cab and is capable of accommodating three persons, and in rear of this seat is a third transverse seat, also having a seating capacity for three. This seat, it will be noticed, is entirely shut off from access from the outside by the sides and back, and in order to allow the pall-bearers to reach this seat easily a portion of the second seat $b'$ is made movable, and when shifted aside a passage is opened to the rear seat. This portion is shown at $x$, being the central section, and is hinged to the adjoining section. The back of this section is hinged to the seat portion of this section, and in order to make the passage the back is folded down, and then the seat and back are tilted aside.

The advantages of this vehicle are obvious. The pall-bearers may conveniently enter the vehicle from the side and easily reach their seats either front or back, and the occupants are thoroughly protected from the weather, and jolting and lateral swaying of the vehicle will not be so perceptible.

I am aware that it is not new to provide a wagon-seat with a shifting section, and I make no claim to this feature, broadly, as my invention consists of a complete vehicle designed to meet a certain demand, in which vehicle a certain arrangement of seats is provided in a particular relation to the door, and in which, also, the shifting section is combined with the intermediate seat located next to the door.

What I claim is—

1. A cab having a closed body portion, a front inside seat in said portion, the doors located in the sides in rear of said seat, a second and a third transverse seat in rear of the doors and within the closed part of the cab, said second seat having a shifting portion adapted to be moved to provide a passage-way to the rear seat, substantially as described.

2. In a pall-bearers' cab having a closed body portion, a front inside seat, the doors located in the sides in rear of said seat, a second and a third transverse seat in rear of the doors, said second seat having a hinged section adapted to be thrown over sidewise, and a back portion hinged to said hinged section, whereby a passage may be opened to the rear seat by folding down the hinged portion of the back of the forward seat and tilting aside the bottom section thereof, substantially as described.

In testimony whereof I affix my signature in presence of two witnesses.

ADOLPH E. HERMAN.

Witnesses:
JAMES D. BIGELOW,
J. N. HOSFORD.